(12) United States Patent
Lee et al.

(10) Patent No.: US 7,990,999 B2
(45) Date of Patent: *Aug. 2, 2011

(54) STARVATION PREVENTION SCHEME FOR A FIXED PRIORITY PCE-EXPRESS ARBITER WITH GRANT COUNTERS USING ARBITRATION POOLS

(75) Inventors: Khee Wooi Lee, Penang (MY); Mikal C. Hunsaker, El Dorado Hills, CA (US); Darren L. Abramson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 12/353,906

(22) Filed: Jan. 14, 2009

(65) Prior Publication Data

US 2009/0119432 A1    May 7, 2009

Related U.S. Application Data

(63) Continuation of application No. 10/975,593, filed on Oct. 28, 2004, now Pat. No. 7,525,986.

(51) Int. Cl.
*H04J 3/02* (2006.01)
*G06F 13/14* (2006.01)
(52) U.S. Cl. ......... 370/462; 710/113; 710/240; 710/309
(58) Field of Classification Search ................... None
See application file for complete search history.

(56) References Cited

U.S. PATENT DOCUMENTS

| 6,009,488 | A | 12/1999 | Kavipurapu |
| 6,016,528 | A * | 1/2000 | Jaramillo et al. ............. 710/243 |
| 6,418,503 | B1 * | 7/2002 | Moertl et al. ................ 710/310 |
| 6,546,017 | B1 | 4/2003 | Khaunte |
| 2003/0088722 | A1 * | 5/2003 | Price ............................ 710/244 |
| 2003/0126376 | A1 | 7/2003 | Blankenship |
| 2003/0204679 | A1 | 10/2003 | Blankenship |
| 2005/0033906 | A1 | 2/2005 | Mastronarde et al. |
| 2006/0080487 | A1 * | 4/2006 | Das et al. ...................... 710/124 |

OTHER PUBLICATIONS

PCI Express Base Specification Revision 1.0a; Apr. 15, 2003; pp. 1-118.

* cited by examiner

*Primary Examiner* — Min Jung
(74) *Attorney, Agent, or Firm* — Blakely, Sokoloff, Taylor & Zafman LLP

(57) ABSTRACT

Method and apparatus for arbitrating prioritized cycle streams in a manner that prevents starvation. High priority and low priority arbitration pools are employed for arbitrating multiple input cycle streams. Each cycle stream contains a stream of requests of a given type and associated priority. Under normal circumstances in which resource buffer availability for a destination device is not an issue, higher priority streams are provided grants over lower priority streams, with all streams receiving grants. However, when a resource buffer is not available for a lower priority stream, arbitration of high priority streams with available buffer resources are redirected to the low priority arbitration pool, resulting in generation of grant counts for both the higher and lower priority streams. When the resource buffer for the low priority stream becomes available and a corresponding request is arbitrated in the high priority arbitration pool, a grant for the request can be immediately made since grant counts for the stream already exist.

20 Claims, 5 Drawing Sheets

STARVATION PREVENTION SCHEME FOR A FIXED PRIORITY PCE-EXPRESS ARBITER WITH GRANT COUNTERS USING ARBITRATION POOLS

CROSS-REFERENCE TO RELATED APPLICATION

The present patent application is a Continuation of application Ser. No. 10/975,593, filed Oct. 28, 2004 now U.S. Pat. No. 7,525,986.

FIELD OF THE INVENTION

The field of invention relates generally to computer and processor-based systems, and, more specifically but not exclusively relates to techniques for arbitrating cycle streams for PCI-Express environments.

BACKGROUND INFORMATION

Over their histories, computing has evolved around a single board-level interconnect (for example, the current de facto interconnect is the Peripheral Component Interconnect (PCI)), while communications equipment has historically incorporated many board-level and system-level interconnects, some proprietary, while others being based on standards such as PCI. As the two disciplines converge, an abundance of interconnect technologies creates complexity in interoperability, coding, and physical design, all of which drive up cost. The use of fewer, common interconnects will simplify the convergence process and benefit infrastructure equipment developers.

As originally specified, the PCI standard (e.g., PCI 1.0) defined an interconnect structure that simultaneously addressed the issues of expansion, standardization, and management. The original scheme employed a hierarchy of busses, with "bridges" used to perform interface operations between bus hierarchies. The original PCI standard was augmented by the PCI-X standard, which was targeted towards PCI implementations using higher bus speeds.

The convergence trends of the compute and communications industries, along with reorganization of the inherent limitations of bus-based interconnect structures, has lead to the recent immergence of serial interconnect technologies. Serial interconnects reduce pin count, simplify board layout, and offer speed, scalability, reliability and flexibility not possible with parallel busses, such as employed by PCI and PCI-X. Current versions of these interconnect technologies rely on high-speed serial (HSS) technologies that have advanced as silicon speeds have increased. These new technologies range from proprietary interconnects for core network routers and switches to standardized serial technologies, applicable to computing, embedded applications and communications.

One such standardized serial technology is the PCI Express architecture. The PCI Express architecture is targeted as the next-generation chip-to-chip interconnect for computing. The PCI Express architecture was developed by a consortium of companies, and is managed by the PCI SIG (special interest group). In addition to providing a serial-based interconnect, the PCI Express architecture supports functionalities defined in the earlier PCI and PCI-X bus-based architectures. As a result, PCI and PCI-X compatible drivers and software are likewise compatible with PCI Express devices. Thus, the enormous investment in PCI software over the last decade will not be lost when transitioning to the new PCI Express architecture.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of starvation prevention schemes for a fixed priority PCI-Express arbiter with grant counters using arbitration pools are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
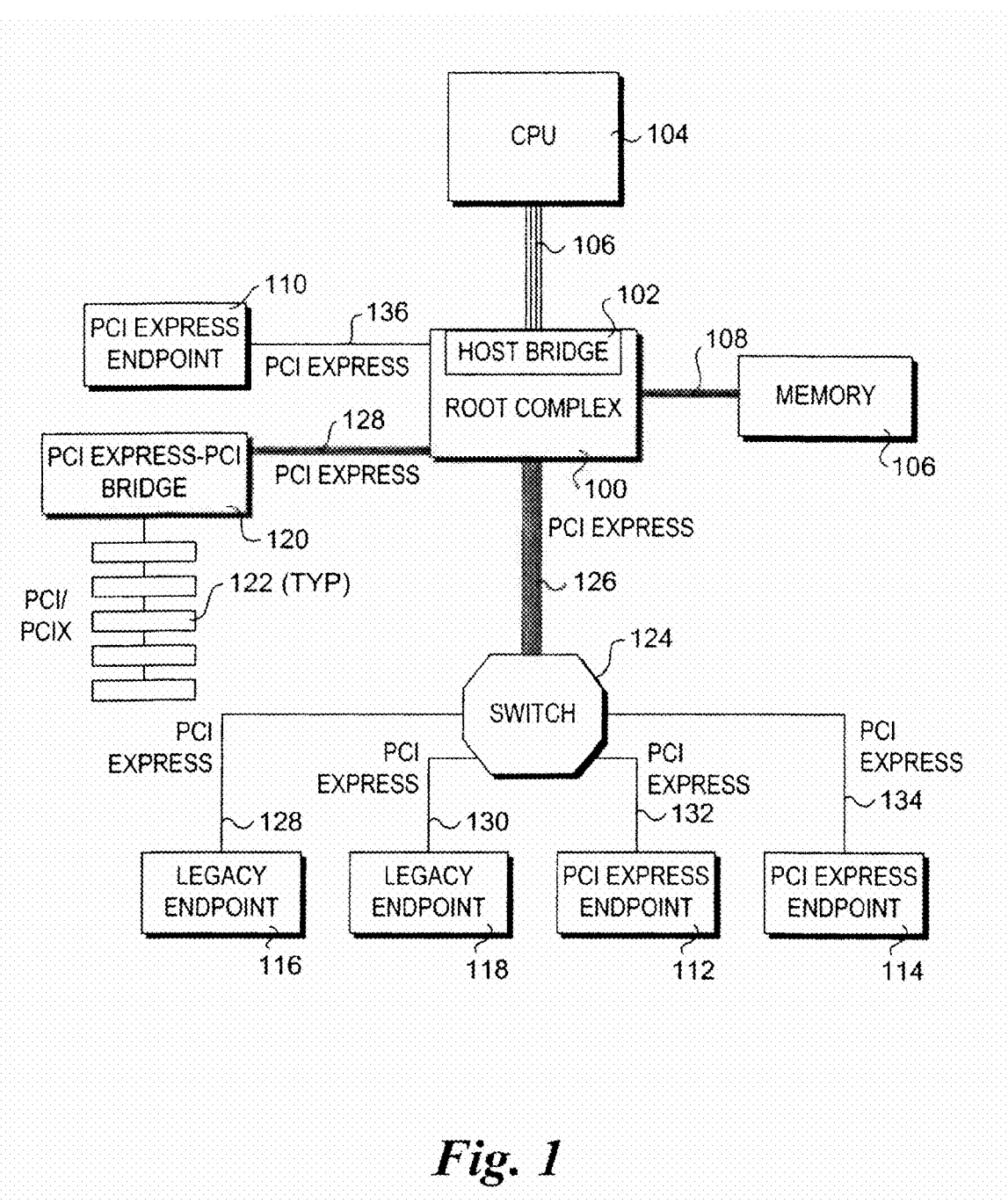
FIG. 1 is a schematic diagram illustrating an exemplary configuration for a PCI-Express architecture.

As an overview, FIG. 1 shows an exemplary configuration of basic PCI-Express elements. At the heart of the PCI-Express architecture is a root complex 100. The root complex denotes the root of an input/output (I/O) hierarchy that connects the CPU/memory subsystem to the system's I/O devices. Accordingly, root complex 100 provides a host bridge 102 to facilitate communications with a host processor (CPU) 104 via an interface 106. Depending on the implementation, interface 106 may comprise a parallel bus, a set of buses, a PCI-Express link, or a combination of the foregoing. Root complex 100 is also coupled to memory 106 via an interface 108. In general, interface 108 may also comprise one or more parallel buses, a PCI-Express link, or a combination of these elements.

A root complex may support one or more PCI Express ports, which comprises an interface between the root complex and a PCI Switch or Endpoint. Each interface defines a separate hierarchy domain. Each hierarchy domain may comprise a single endpoint or a sub-hierarchy containing one or more switch components and endpoints.

Endpoints refer to types of devices that can be a Requester or Completer of a PCI Express transaction, either on its own behalf or on behalf of a distinct non-PCI Express device (other than a PCI device or Host CPU), e.g., a PCI Express attached graphics controller or a PCI Express-USB host controller. Endpoints are classified as either legacy or PIC Express endpoints. The exemplary endpoints depicted in FIG. 1 includes PCI Express endpoints 110, 112, and 114, and legacy endpoints 116 and 118.

The PCI-Express architecture introduces the concept of switch elements for PCI-based infrastructure. A PCI Express Switch is defined as a logical assembly of multiple virtual PCI-PCI bridge devices, and enables multiple downstream endpoints (or other switches) to communicate with an upstream root complex or switch. The exemplary PCI configuration of FIG. 1 includes a switch 124 having an upstream port connected to root complex 100 via a PCI Express link 126 and four downstream ports connected to legacy endpoints 116 and 118 via PCI Express links 128 and 130, and to PCI Express endpoints 112 and 114 via PCI Express links 132 and 134. A switch is a logical element that may be contained within a component that also contains a host bridge, or may be implemented as a separate component (as illustrated in FIG. 1). Switches are used to replace conventional multi-drop buses, and are used to provide fan-out for the I/O bus. A switch may provide peer-to-peer communication between different endpoints. It also may be used to forward data between an endpoint and a root complex. In the case of peer-to-peer communications between endpoints, if it does not involve cache-coherent memory transfers, the traffic need not be forwarded to a host bridge.

A root complex also may be connected to one or more PCI Express-PCI bridges, such as PCI Express-PCI bridge 120 shown in FIG. 1. A PCI Express-PCI bridge provides a connection between a PCI Express fabric and a PCI/PCI-X device hierarchy, as depicted by a hierarchy of PCI/PCI-X devices 122.

Under the PCI-Express architecture, the parallel buses historically used to connect components in a conventional PCI system are replaced by PCI-Express links, with each link comprising one or more lanes. For example, PCI-Express links having multiple lanes may be used to connect root complex 100 to switch 124, and to PCI-Express-PCI bridge 120, as depicted by PCI Express links 126 and 128, respectively. Meanwhile, each of PCI Express links 128, 130, 132, 134, and 136 comprises single-lane links.

At one level, the PCI-Express architecture eliminates the bus arbitration schemes that were required under the conventional PCI/PCI-X architectures. This is because dedicated PCI-Express links may be provided for each PCI-Express endpoint, rather than using a shared bus structure. However, there is still a need for communication path arbitration. Such arbitration must be provided at components that are linked to multiple endpoints or switches, such as host bridge 100 and switches 122. Further arbitration is needed for virtual channels hosted by a common link and arbitration of streams for a given virtual channel or link.

In brief, the PCI-Express switches and root complexes perform functions similar to network switches and routers. This is enabled, in part, via a packetized transmission scheme that is implemented via a multi-layer protocol that is similar to that employed by conventional networking protocols, such as Ethernet. The PCI-Express transmission scheme supports many features that are familiar to conventional networking, including Quality of Service (QoS) and traffic classification. Thus, a switch or host bridge not only has to arbitrate between competing traffic transported via different links, but also between priority levels assigned to such traffic.

With regard to traffic priority considerations, a PCI Express link may support multiple virtual channels per lane. Up to eight different independently controlled communication sessions may exist in a single lane. Each session may have different QoS definitions per the packet's Traffic Class attribute. As a packet travels through a PCI Express fabric, at each switch or link endpoint, the traffic class information can be interpreted and appropriate transport policies applied.

In general, access to a given lane that hosts multiple prioritized virtual channels dictates some form of arbitration scheme. In order to support enhanced service for higher priority channels, it is necessary to give corresponding packets preference over packets for lower priority channels. Thus, packets corresponding to higher priority channels are forwarded at a higher rate, on average, than those packets corresponding to lower priority channels.

In addition to arbitration of prioritized virtual channels, there exists a need to arbitrate cycle streams for each channel (either a virtual channel on a shared link or a the channel for a link that does not support or employ virtual channels). Cycle streams correspond to streams of PCI-Express requests and data that are have a common type, wherein different types of requests are separated into different cycle streams. The term "cycle" refers to processing of a particular request based on a current cycle. Typically, received messages will be separated into separate cycle streams based on type information contained in the message headers. Furthermore, under some embodiments, separate priority levels will be assigned to each cycle stream.

Figure 2:
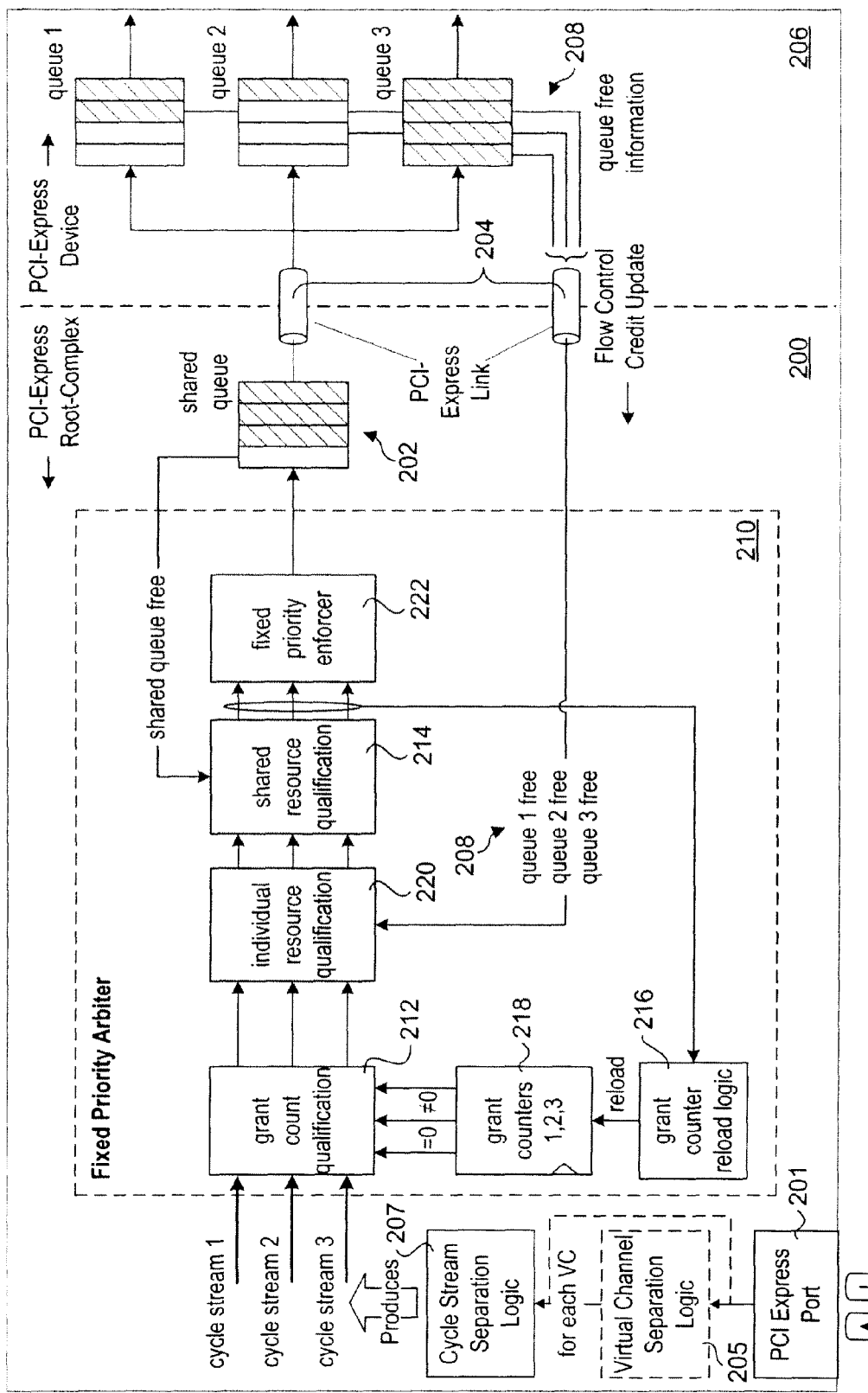
FIG. 2 is a schematic diagram illustrating an arbitration scheme using a fixed priority arbiter that may produce starvation of low-priority cycle streams.

One technique for handling arbitration of prioritized cycle streams (i.e. virtual channels) is illustrated in FIG. 2, which shows a block diagram of a PCI-Express system that implements a fixed priority arbiter with grant counters. Three cycle streams (1, 2, 3) in a PCI-Express root-complex 200 arbitrate for a shared queue resource 202 in order to be transmitted over a PCI-Express Link 204 to an attached PCI-Express device 206. In the PCI-Express device 206, requests and associated data corresponding to the input cycle streams are put into individual queues (queue 1, 2, 3). In response to access requests, individual queue free information 208 from queues 1, 2, and 3 is sent back to root-complex 200 via flow control packets over PCI-Express Link 204. A fixed priority arbiter 210 looks at the queue free signals 208 from the individual queues 1, 2, and 3 in combination with shared queue free signals 212 from shared queue 202 (indicating the availability of the shared queue) to make sure there is relevant queue space available before granting a cycle stream.

Upon being received at a PCI-Express port 201 coupled to a PCI-Express link 203, incoming packets are separated into appropriate cycle streams. In cases in which virtual channels are supported for a given link, a first-level virtual channel separation operation is performed to separate the packets into separate virtual channel streams. This operation is facilitated by virtual channel separation logic 205, which separates packets based on the Traffic Class value specified in the packet header of each packet. Cycle stream separation logic 207 is then applied to each virtual channel stream to separate the packets into corresponding cycle streams. In cases in which virtual channels are not supported, incoming packets received for the single physical channel corresponding to the link are forwarded directly to cycle stream separation logic 207. The cycle stream separation logic examines the Type information present in the packet header of each packet to determine which cycle stream the packet is to be directed to. The PCI-Express types include Memory, I/O, Config(uration), Message, Request, and Completion.

In one embodiment of a PCI-Express system, cycle streams 1, 2, and 3 respectively comprise Posted, Non-Posted and Completion cycles. Posted cycles typically pertain to transactions that are "posted" to a PCI-Express device. These are given the lowest priority, and include memory writes and message requests. Non-posted transactions pertain to transactions that are not posted, such as read requests and I/O or configuration write requests. Completion cycles are used to indicate that a cycle has successfully completed and are assigned the highest priority. Completion cycles include read completions (including the returned read data) and I/O or configuration write completions.

Under a typical PCI-Express device access sequence, the process begins with a requesting device (the requester) submitting a request to be serviced by a destination or servicing device (the completer). For example, a requesting PCI-Express device may send a write request to be serviced completer such as a memory controller or the like. This initial request informs the completer that access to that device is wanted. It also informs an intermediate device (e.g., a PCI-Express root complex in the immediate example) coupled between a requester and completer that the requester desires to access the completer via the intermediate device. In general, the request may include a size for a corresponding data transfer such that the completer and intermediate device can verify that adequate buffer resources are available to service the request.

In response to receiving the request, a check is made to determine if the completer can receive any (or an amount specified of) data. The completer provides continuous feedback to the arbiter (using flow control messages) indicating whether it can accept data or not. In the context of FIG. 2, this data pertains to queue free information 208, which is returned to fixed priority arbiter 210 in the form of flow control credits. PCI Express transactions use a credit-based flow control mechanism (messages containing flow control credits, managed by the transaction layer) that ensures the receiving device has enough buffer resources available to accept the size and type of data transfer from the sending device. In view of grant counts, flow control credits and shared queue free information, the fixed priority arbiter logic issues a grant to a grant count qualification block 212. Different respective grants may be issued in response to requests from different cycle streams. In cases in which a completer does not have adequate buffer resources, a grant is not provided. At the same time, a requester will repeat its access request until the request is serviced. Thus the access request, and corresponding processing of the access request will be repeated until adequate buffer resources are available.

Upon receiving a write grant, data from a requesting device is forwarded to the completer. In one embodiment, a shared queue is employed to ensure cycles are streamed efficiently over the PCI Express link and to absorb any temporary latency in getting a packet to be transmitted over the link. In accordance with the exemplary scheme of FIG. 2, this data is stored in shared queue 202. As such, another consideration for issuing grants is whether or not there is enough storage space available in shared queue 202. This determination is made by circuit logic depicted by a shared resource qualification logic block 214.

In a conventional fixed priority arbiter, each cycle stream request is assigned a fixed priority number and a cycle stream request is granted if there are no other higher priority cycle stream requests. To prevent higher priority requests from starving the lower priority requests, each request is normally assigned a grant count which is employed by a grant counter associated with each cycle stream. Each time a request is granted, its grant counter is decremented by one. When the grant count of a request reaches zero, it will be blocked from arbitrating so that other lower priority requests that have not used up their grant counts can be granted. The grant counts are reloaded to their initial values when all of them have reached zero. The grant counters for cycle streams 1, 2, and 3 are depicted by grant counters 218 in FIG. 2. The outputs of shared resource qualification block are provided as inputs to grant counter reload logic 216, which is used to reload grant counters 218.

If the arbiter also needs to comprehend resource availability, like in the PCI-Express system in FIG. 2, the cycle streams that are not blocked at the grant count qualification stage are forwarded to an individual queue qualification stage 220, whereby the cycle streams with available individual queue resources are sent to the following shared queue qualification stage 214. If the shared queue is available, all qualified cycle streams are sent to fixed priority enforcer logic 222 in which the highest priority cycle stream is granted. As an illustration, if all 3 cycle streams are assigned the same initial grant count value, each of them will have a chance to be granted 33.3% of the time in a continuously streaming steady-state condition under which none of the queues get full.

Starvation Problem

In the case when some of the queues can and do get full, the conventional fixed priority arbitration scheme might introduce a starvation situation. For instance, if cycle stream 3 has not used up its grant count but cannot be granted because queue 3 is full, and cycle stream 2 has used up its grant count but queue 2 is not full, we would naturally want to grant cycle stream 2 if shared queue 202 is available, so that we do not waste any bandwidth on PCI-Express Link 204 while waiting for queue 3 to free up. The obvious option to achieve this is to reload the grant count of cycle stream 2 so that it can be granted. However, since cycle stream 2 has higher priority that cycle stream 3, once its grant count is reloaded, it will continually be granted in favor of cycle stream 3 until its grant count is used up again, even by the time queue 3 has already freed up for cycle stream 3 to proceed.

As a result, cycle stream 3 is starved because it is deprived of being granted by the time it is ready to accept more data (i.e., queue 3 is no longer full). Assuming that cycle stream 1 does not play an active role here and the initial grant count values are set to "5" for all cycle streams, the grant sequences below illustrate how cycle stream 3 might be granted in the normal case (none of the queues get full) and the starvation case described above. The underlined "2" refers to the time when cycle stream 2 grant count is reloaded under the condition described above. The last sequence illustrates the fair and desired grant sequence assuming that queue 3 does get freed up almost immediately after cycle stream 2 grant count is reloaded.

Normal Case: 11111 22222 33333 . . . .
Starvation Case: 11111 22222 $\underline{22222}$ 3 $\underline{22222}$ 3 $\underline{22222}$ 3 22222 3 22222 3 . . . .
Desired Case: 11111 22222 2323232323 . . . .

The starvation problem is exponentially amplified if cycle stream 1 also plays an active role and starves cycle stream 2, which in turn starves cycle stream 3. In this worst case, the grant sequence might even look like that shown below where cycle stream 3 rarely has a chance to be granted even though it has the same initial grant count values as cycle streams 1 and 2.

Worst Case: . . . 2 11111 2 11111 2 11111 2 11111 2 11111 3 . . . .

Figure 3:
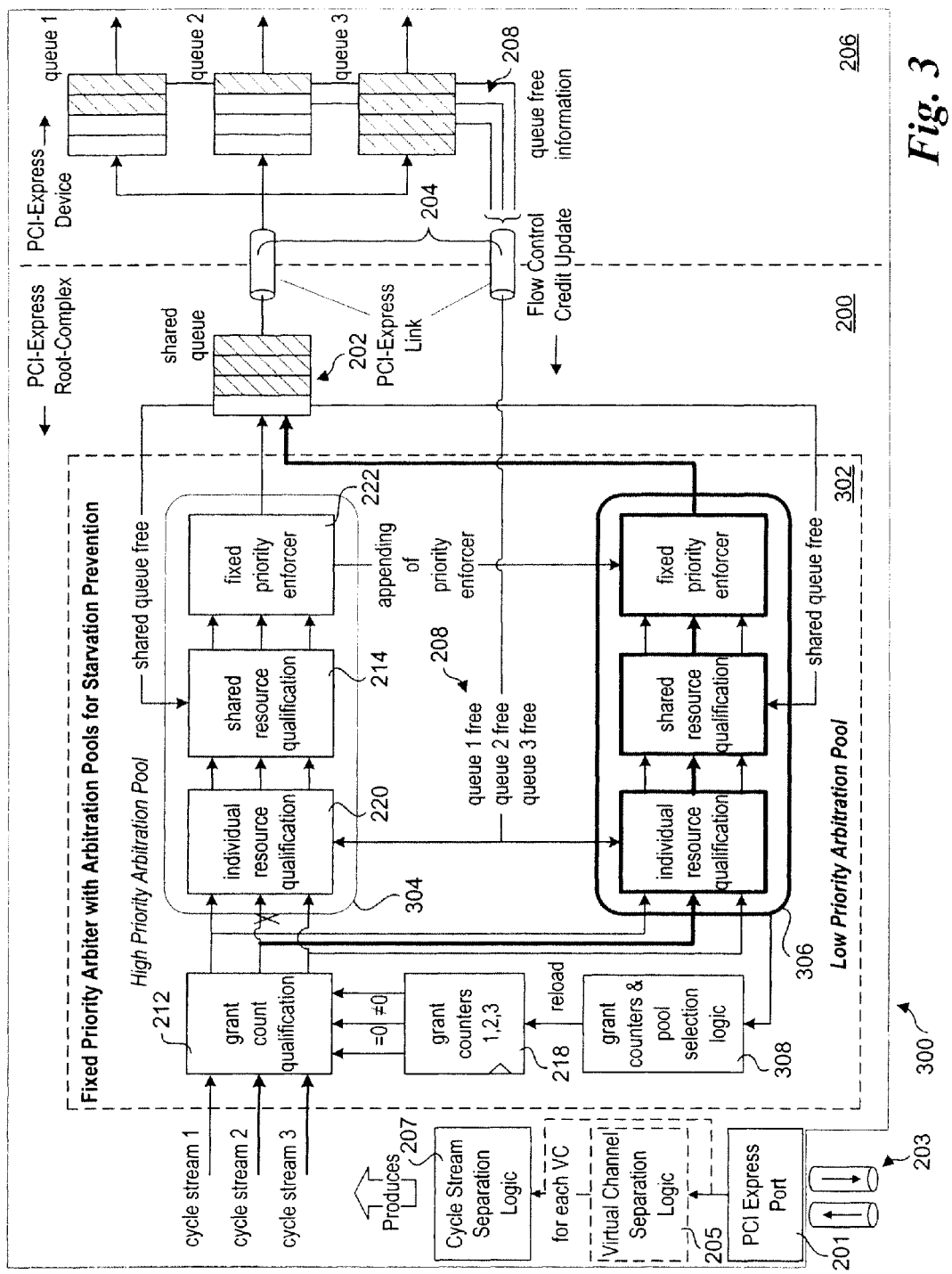
FIG. 3 is a schematic diagram illustrating an embodiment of an arbitration scheme employing high- and low-priority arbitration pools that prevents starvation of low-priority cycle streams

An architecture 300 corresponding to one embodiment of the invention that addresses the foregoing starvation problem is shown in FIG. 3. Architecture 300 details components and logic for a PCI-Express fixed priority arbitration scheme with high- and low-priority arbitration pools for starvation prevention, depicted generally at 302. The logic of the high- and low-priority arbitration pools are cascaded in the manner described below with reference to FIG. 4 to enable grant counts to be provided to lower-priority streams when their destination (completer device) resource buffers are not available, thus eliminating the starvation problem associated with fixed priority arbitration schemes by enabling data corresponding to those streams to be forwarded as soon as the resource buffers become available. In further detail, the low priority pool enables resetting of the grant count of the high priority request that has used up its grant count but has available buffer resources. The key is that once the high priority request grant count is reset, the request is moved to the low priority pool so that other requests in the high priority pool are not penalized.

As depicted by like-numbered reference numbers in FIGS. 2 and 3, many of the components and logic of architecture 300 are similar to those described above with reference to the fixed priority arbiter architecture of FIG. 2. As further shown in FIG. 3, the components and logic for individual resource qualification block 216, shared resource qualification block 214 and fixed priority enforcer 220 are grouped to define a High Priority Arbitration Pool 304. In addition to these components, architecture 300 provides a Low Priority Arbitration Pool 306, which comprises a copy of the queue resource qualification logic and fixed priority enforcer logic of High Priority Arbitration Pool 302. The Low Priority Arbitration Pool provides a means to continue granting counts to requests that have used up their grant counts, but might have available resources Output from both High Priority Arbitration Pool 304 and Low Priority Arbitration Pool 306 are provided as inputs to grant counters and pool selection logic 308, which in turn is used to reload grant counters 218.

As discussed above, Low Priority Arbitration Pool 306 contains a copy (e.g., similar logic) of the queue resource qualification logic and the fixed priority enforcer of High Priority Arbitration Pool 304. However, rather than providing equal prioritization, all requests provided as inputs to Low Priority Arbitration Pool 306 will be serviced at lower priority than any request in the High Priority Arbitration Pool. In one embodiment this is accomplished by appending the fixed priority enforcer logic of the Low Priority Arbitration Pool below the fixed priority enforcer logic of the High Priority Arbitration Pool, as described below.

As an example of how this arbitration scheme works, consider the foregoing example discussed above with respect to FIG. 2. In this instance, the cycle stream 2 grant count will still be reloaded as before, but cycle stream 2 will be blocked from the High Priority Arbitration Pool by the arbiter logic and sent to the Low Priority Arbitration Pool instead, as shown in FIG. 2 by the thickened lines with arrows.

In this manner, we can continue granting cycle stream 2 via the Low Priority Arbitration Pool, and when queue 3 has been freed up, cycle stream 3 can be granted immediately via the High Priority Arbitration Pool because its grant count is non-zero and it has higher priority than cycle stream 2 (since it is now being arbitrated in the Low Priority Arbitration Pool).

Similarly, If cycle stream 1 has also used up its grant count but has queue resources available, we can similarly reload its grant count, block it from the High Priority Arbitration Pool and send it to the Low Priority Arbitration Pool for arbitration. All requests in the Low Priority Arbitration Pool can be granted according to the original priority order. Their grant counts can also be repeatedly reloaded in the Low Priority Arbitration Pool while waiting for resource of the request in the High Priority Arbitration pool to be freed up.

This arbitration scheme of FIG. 3 provides a simple and symmetrical way of handling the starvation problem presented above. The scheme can be easily generalized to any fixed priority arbiters of any input sizes, and can be easily scaled to support any number of virtual channels.

Figure 4:
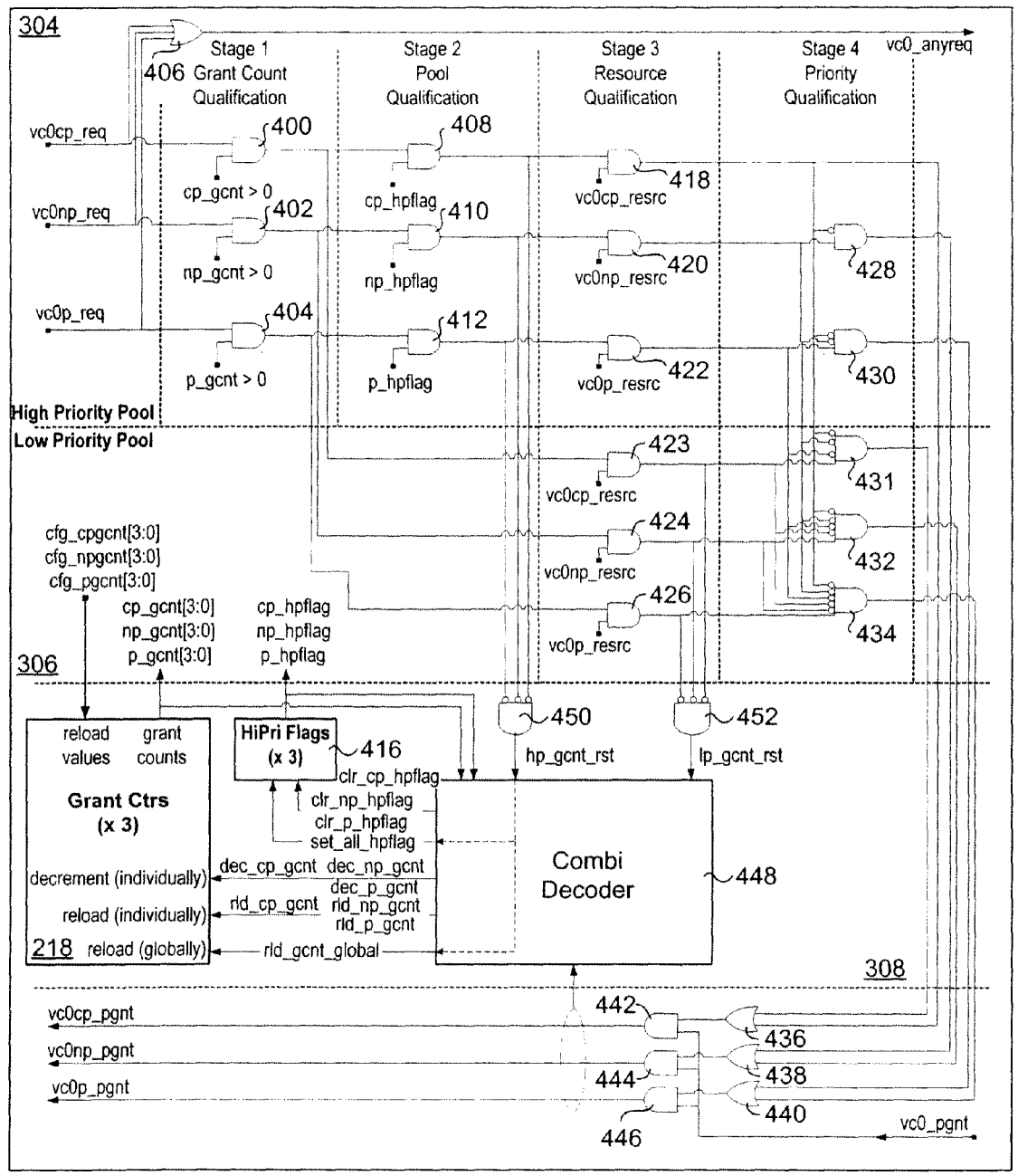
FIG. 4 is a schematic diagram illustrating circuitry for implementing the arbitration scheme of FIG. 3, according to one embodiment of the invention.

Details of one embodiment of circuitry and logic for implementing the arbitration scheme of FIG. 3 are shown in FIG. 4. The architecture includes four stages 1-4. Stage 1, which corresponds to logic for grant count qualification block 212, receives three types of request inputs corresponding to cycle streams 1-3 of FIGS. 2 and 3. These include vc0cp_req, vc0np_req, and vc0p_req. The nomenclature for these inputs, as well as other inputs described below, is a follows. "vc0" identifies the inputs are for virtual channel 0; this is merely exemplary, as similar logic may be applied to any number of virtual channels. More specifically, if n virtual channels are to support the arbitration scheme, then a component implementing the scheme would employ n instances of the circuitry and logic shown in FIG. 4. "cp" represents completion, while "np" stands for non-posted, and "p" stands for posted. "req" stands for request. Thus, for example, input vc0cp_req refers to an input on virtual channel 0 corresponding to a completion request.

As shown in FIG. 4, vc0cp_req, vc0np_req and vc0p_req are provided as respective inputs to AND gates 400, 402, and 404. For a given clock cycle, the assertion of an input produces a logic level '1', with the absence of an input produces a logic level '0'. The second inputs for AND gates 400, 402, and 404 are logic values that are determined by the current grant counts output by grant counters 218. These include values for the completion grant count (cp_gcnt), the non-posted grant count (np_gcnt) and the posted grant count (p_gcnt). If a grant count value is greater than 0, then its corresponding input has a logic '1' value. In addition to the AND gates for stage 1, vc0cp_req, vc0np_req, and vc0p_req are provided as inputs to an OR gate 406, which produces an output (vc0_anyreq) identifying whether any request for virtual channel 0 are asserted for the current clock cycle.

The outputs of AND gates 400, 402, and 404 are provided as respective inputs to AND gates 408, 410, and 412 of a stage 2, which is used for pool qualification. Pool qualification is used to direct arbitration operations to either High Priority Arbitration Pool 304 or Low Priority Arbitration Pool 306. The second inputs for AND gates 408, 410 and 412 are completion, non-posted, and posted high-priority flags (respectively cp_hpflag, np_hpflag and p_hpflag), which are used to indicate whether the High Priority or Low Priority Arbitration Pool is applicable for arbitrating the current request. The values (i.e., logic levels) of the completion, non-posted and posted high-priority flags are defined by a high-priority flags generator 416.

The stage 3 resource qualification inputs include the outputs of AND gates 408, 410, and 412, which are respectively provided as inputs to AND gates 418, 420, and 422. The logic level for a second input to AND gate 418 (vc0cp_resrc) is determined based on whether the buffer resource for the completion stream destination queue (queue 1 in the immediate example) is available. This will be dependent on the flow control credits issued for the queue in the manner discussed above in combination with the shared queue free information. Similarly, the second input for AND gate 420 (vc0np_resrc) is dependent on the availability of the destination buffer resource for non-posted requests (e.g., queue 2), while the second input for AND gate 422 (vc0p_resrc) is dependent on the availability of the destination buffer resource for posted request (e.g., queue 3).

The outputs of stage-1 AND gates 402 and 404 are also provided as inputs to AND gates 423, 424 and 426 of Low Priority Arbitration Pool 306. The other inputs for these AND gates are other shared instances of the vc0cp_resrc, vc0np_resrc and vc0p_resrc values discussed above for the stage-3 resource qualification inputs to AND gates 420 and 426.

Stage 4 priority qualification includes AND gates 428, 430, 431, 432, and 434, which are provided with inputs (both inverted and non-inverted) from the stage 3 AND gates 418, 420, and 422 and Low Priority Arbitration Pool AND gates 423, 424 and 426. The inputs to these gates are "cascaded", with the AND gate at each lower level receiving another inverted input shared by the AND gate above. For example, AND gate 428 receives an inverted output from AND gate 420 and a non-inverted output from AND gate 420, while AND gate 430 receives the inverted output from AND gate 418, an inverted output from AND gate 420, and a non-inverted output from AND gate 422.

The outputs of the Stage 4 priority qualification logic are provided as inputs to the logic shown at the bottom of the diagram of FIG. 4. This includes OR gates 436, 438 and 440, as well as AND gates 442, 444, and 446. This logic, in combination with a combi(nation) decoder 448 produces pre-grant signals vc0cp_pgnt, vc0np_pgnt, and vc0p_pgnt. Pre-grant signals are employed by additional logic (not shown) to enable corresponding grants to be made during the next clock cycle.

In addition to the output of AND gates 442, 444 and 446, the inputs for combi decoder 448 include a high priority grant count reset (hp_gcnt_rst) signal output by an AND gate 450, a similar low priority grant count reset (lp_gcnt_rst) signal output by an AND gate 452, the completion, non-posted and posted high priority flags (cp_hpflag, np_hpflag and p_hpflag), and the completion, non-posted and posted grant counts provided by grant counters 218. In one embodiment, the grant counters comprise 4-bit values, as depicted by cp_gcnt[3:0], np_gcnt[3:0] and p_gcnt[3:0]. The combin decode produces several outputs, including clear signals for the completed, non-posted and posted high priority flags (clr_cp_hpflag, clr_np_hpflag and clr_p_hpflag), a signal to set all high priority flags (set_all_hpflag), decrement count signals for the completed, non-posted and posted grant counts (dec_cp_gcnt, dec_np_gcnt and dec_p_gcnt), reload signals for the completion, non-posted and posted grant counts (rld_cp_gcnt, rld_np_gcnt and rld_p_gcnt), and a global grant count reload signal (rld_gcnt_global).

Each input request (cycle) stream to the arbiter has a corresponding grant counter and a high priority flag. The grant counts and high priority flags are managed using the following rules:

The grant count of a request is individually decremented whenever the request is granted (Note the exception below when grant count is 1).

The grant count decrement signal is simply the request grant signal. For example np_gcnt[3:0] will be decremented by 1 in the next clock when np_pgnt is asserted. (Note the exception below when grant count is 1).

The high priority flags are preset to 1 after reset so that all requests will arbitrate in the High Priority Pool initially.

The high priority grant count reset (hp_gcnt_rst) will be asserted when there is no more active requests at the output of the Pool Qualification stage.

The low priority grant count reset (lp_gcnt_rst) will be asserted when there is no more active requests at the output of the Low Priority Pool Resource Qualification stage.

The resetting of grant counts and the clearing/setting of the high priority flags are governed by the following rules, using FIG. 4 as an example:

1. If the high priority grant count reset (hp_gcnt_rst) is asserted, then:
   All the high priority flags are set.
   All the grant counts are reloaded.
2. If the low priority grant count reset (lp_gcnt_rst) is asserted, then:
   All the high priority flags are NOT affected.
   The grant counts of the requests that have their high priority flags cleared are reloaded.
3. If a request is granted when its grant count is 1 and the high priority flag is set:
   The high priority flag of the request will be cleared.
   The grant count of the request is reloaded.
4. If a request is granted when its grant count is 1 and the high priority flag is cleared:
   The grant count of the requests is decremented to 0.
   It will have to wait until the low priority grant count reset to go again.

The grant count reset signals might be active when the grant count decrement signal is active. In this case the grant count reset will take place.

The arbiter grant count reset/decrement and the high priority flags set/clear control signals are generated as shown in Table 1.

TABLE 1

| Signal | Equation | Description |
|---|---|---|
| clr_np_hpflag_nxt | np_pgnt * (np_gcnt == 1 * np_hpflag) | individual HiPri flag clear |
| clr_p_hpflag_nxt | p_pgnt * (p_gcnt == 1 * p_hpflag) | individual HiPri flag clear |
| clr_np_hpflag | Flopped clr_np_hpflag_nxt | flop existing clr_np*_hpflag signal |
| clr_p_hpflag | Flopped clr_p_hpflag_nxt | flop existing clr_np*_hpflag signal |
| set_all_hpflag | hp_gcnt_rst | global HiPri flags set |
| dec_np_gcnt | np_pgnt * !(np_gcnt == 1 * np_hpflag) | individual grant count decriment |
| dec_p_gcnt | p_pgnt * !(p_gcnt == 1 * p_hpflag) | individual grant count decriment |
| rld_np_gcnt | (lp_gcnt_rld * !np_hpflag) + clr_np_hpflag | individual grant count reset |
| rld_p_gcnt | (lp_gcnt_rld * !p_hpflag) + clr_p_hpflag | individual grant count reset |
| rld_gcnt_global | hp_gcnt_rld | global grant count reset |

In one embodiment, the reload values for the completion, non-posted and posted grant counters are specified via configurable inputs. In the illustrated embodiment of FIG. 4, these comprise 4-bit inputs, which are depicted as cfg_cpgcnt[3:0], cfg_npgcnt[3:0] and cfg_pgcnt[3:0].

In one embodiment, completion requests are assigned to a highest priority that is not arbitrated using the high and low priority arbitration pools. Thus, a completion request is always granted immediately if there is sufficient space available in the corresponding queue at the destination PCI-Express device. Under a corresponding implementation, there is not need to employ a grant counter or high-priority flag for the completion cycle stream; accordingly, AND gates 400 and 408 will not exist.

In general, embodiments of the fixed priority arbiter with starvation prevention may be implemented in various types of components, including PCI-Express root complexes and switches. Such components may be employed for various types of processing and communication tasks, and may typically be implemented in desktop platforms, mobile platforms, and server platforms. The components will typically comprise integrated circuits manufactured using well-known semiconductor manufacturing techniques. Generally, the integrated circuits will comprises application specific integrated circuits (ASICs), although other types of circuits, such as programmable logic gate arrays (PLGAs) may also be used.

Figure 5:
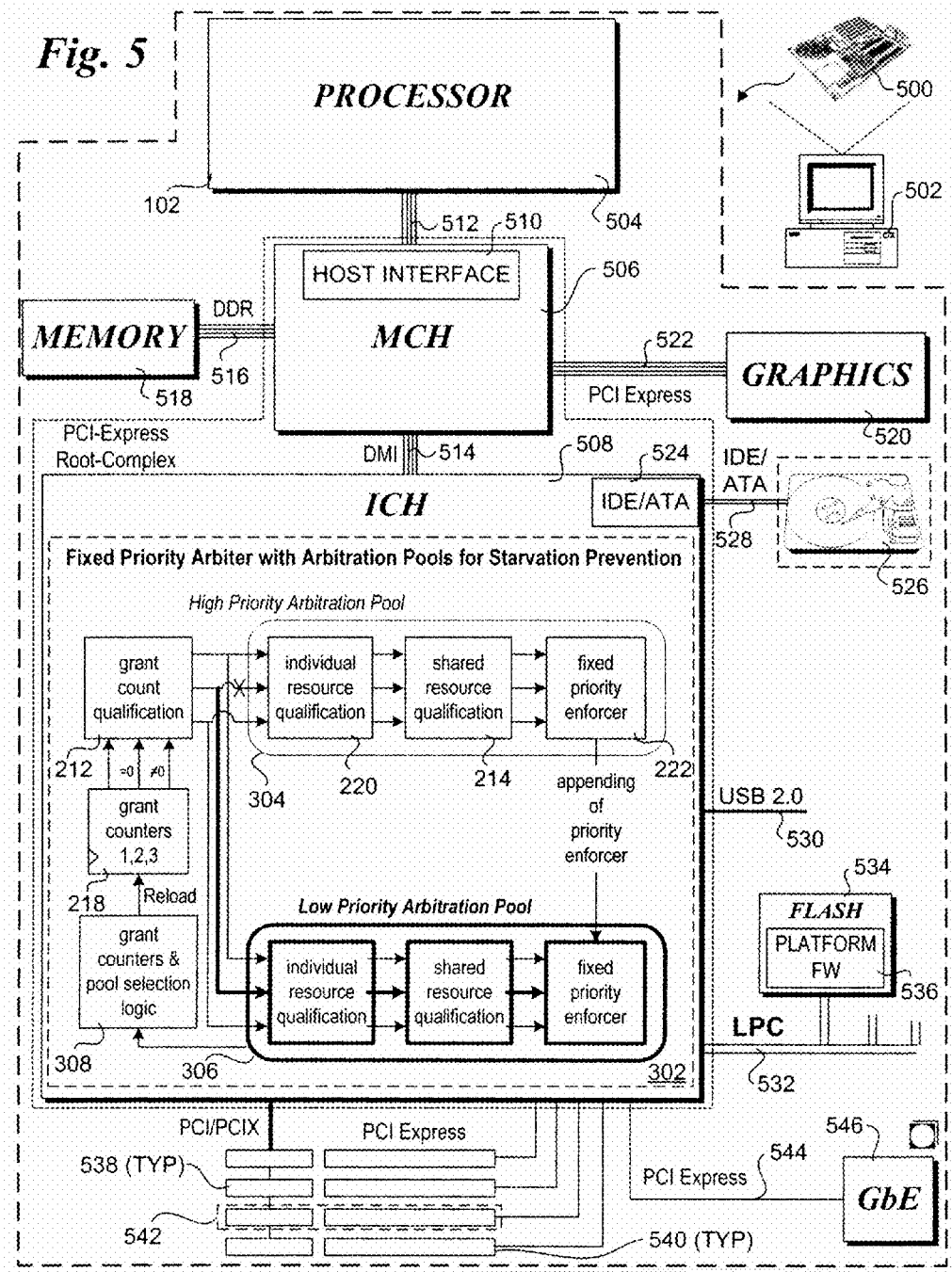
FIG. 5 is a schematic diagram of a computer platform architecture including an I/O bridge that implements an embodiment of the arbitration scheme of FIG. 3.

An exemplary desktop platform architecture including a chipset that implements an embodiment of the fixed priority arbiter with starvation prevention is shown in FIG. 5. More specifically, FIG. 5 shown architecture details of a motherboard 500 employed in a desktop computer 502. The core components of the platform architecture includes a processor 504 (i.e., CPU), a memory controller hub (MCH) 506, and an input/output controller hub (ICH) 508. MCH 506 includes a host interface 510 that provides an interface to processor 504 via a bus 512. MCH 506 is communicatively-coupled to ICH 508 via a direct media interface (DMI) 514. In the illustrated embodiment, the combination of ICH 508 and MCH 506 comprises the PCI-Express root complex for the platform.

Typically, an MCH, which is also commonly referred to as a memory bridge or the "Northbridge", is used to provide a high-speed interface to system memory and other platform devices, such as on-board graphics. In the exemplary configuration of FIG. 5, MCH 506 provides a double data-rate (DDR) memory interface 516 for interfacing with system memory 518. MCH 506 also includes a PCI Express port to communicate with a built-in graphics controller 520 via a PCI Express link 522.

An ICH, which is commonly referred to as the I/O bridge or "Southbridge", is used to provide an interface to various platform I/O devices and add-on peripheral devices. In the illustrated embodiment, ICH 508 provides an IDE/ATA (integrated drive electronics-AT attachment) interface 524 that supports I/O communication with one or more disk drives 526 (which would typically be external to the motherboard and housed in the chassis for the desktop computer) via an ATA link 528. In one embodiment ATA link 528 comprises a serial ATA link. ICH 508 also provides a USB (universal serial bus) 2.0 interface 530, and a low pin-count (LPC) interface to communicate with devices coupled to an LPC bus 532. Such devices will typically include a flash device 534 that is used to store platform firmware 536.

ICH 508 also provides support for both conventional PCI/PCI-X devices and PCI-Express devices. In the illustrated embodiment, motherboard 500 includes four PCI/PCI-X add-on slots 538. The motherboard also includes four PCI-Express add-on slots 540. Under the PCI-Express electromechanical specification, a common slot may be configured to support both PCI/PCI-X add-on boards and PCI-Express add-on boards, as depicted by a combination slot 542. The architecture of FIG. 5 also includes a PCI Express link 544 coupled to a Gigabyte Ethernet (GbE) network interface controller 546.

As depicted by the dashed box in ICH 508, the ICH also includes logic circuitry to facilitate an embodiment of the fixed priority arbiter with arbitration pools for starvation prevention. In one embodiment, the circuit elements of FIG. 4 are employed and operate in the manner discussed above. For clarity, logic for performing virtual channel separation and cycle stream separation is not shown in FIG. 4; however, it will be understood that such logic is provided by ICH 508.

In addition to implementing embodiments of the present description on a semiconductor chip, they may also be implemented via machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

The invention claimed is:

1. A method comprising:
   receiving a first request and a second request by an arbiter device, the first request having a lower priority than a second request; and
   designating the first request for forwarding to a first destination by the arbiter device prior to the second request based on a determination that the second request cannot immediately be forwarded to a second destination due to unavailable resources at the second destination.

2. The method of claim 1, further comprising:
   resetting a grant count for a first stream of the first request; and
   assigning the first stream to a lower priority arbitration pool.

3. The method of claim 1, wherein a grant count for a first stream of the first request is exhausted and a grant count for a second stream of the second request has not been exhausted.

4. The method of claim 1, further comprising:
   designating pending requests for forwarding from a lower priority arbitration pool over pending requests of a higher priority arbitration pool until required resources for the higher priority arbitration pool are available.

5. The method of claim 1, further comprising:
   receiving resource availability information from the first destination and the second destination.

6. The method of claim 1, further comprising:
designating pending request for forwarding from a stream with a lower priority prior to pending requests from a stream with a higher priority based on the stream with the higher priority being assigned to a lower priority arbitration pool and the stream with a lower priority being assigned to a higher priority arbitration pool.

7. The method of claim 1, wherein the arbiter device is a component of a PCI express root complex and the first destination and second destination are PCI express devices.

8. An apparatus comprising:
a first communication port to receive a first request and a second request;
a second communication port to forward the first request to a first device and the second request to a second device; and
an arbiter to select the first request from a lower priority stream over the second request from a higher priority stream based on the second device not being immediately available to service the second request.

9. The apparatus of claim 8, wherein the arbiter further comprises:
a high priority arbitration pool including an individual resource qualification circuit, a shared resource qualification circuit and a fixed priority enforcer circuit.

10. The apparatus of claim 8, wherein the arbiter further comprises:
a low priority arbitration pool including an individual resource qualification circuit, a shared resource qualification circuit and a fixed priority enforcer circuit.

11. A system comprising:
a motherboard;
a PCI-Express link on the motherboard;
a first PCI-Express device slot coupled to the PCI-Express link;
a second PCI-Express device slot coupled to the PCI-Express link; and
an input/output (I/O) bridge, coupled to the PCI-Express link including a first communication port to receive a first request and a second request, a second communication port to forward the first request to a first PCI-Express device slot and the second request to a second PCI-Express device slot, and an arbiter to select the first request from a lower priority stream over the second request from a higher priority stream based on a device in the second PCI-Express device slot not being immediately available to service the second request.

12. The system of claim 11, further comprising, wherein the arbiter further comprises:
a high priority arbitration pool including an individual resource qualification circuit, a shared resource qualification circuit and a fixed priority enforcer circuit.

13. The system of claim 11, wherein the arbiter further comprises:
a low priority arbitration pool including an individual resource qualification circuit, a shared resource qualification circuit and a fixed priority enforcer circuit.

14. A machine-readable storage medium, having instructions stored therein, which when executed, cause a machine to perform a set of operations comprising:
receiving a first request and a second request by an arbiter device, the first request having a lower priority than a second request; and
designating the first request for forwarding to a first destination by the arbiter device prior to the second request based on a determination that the second request cannot immediately be forwarded to a second destination due to unavailable resources at the second destination.

15. The machine-readable storage medium of claim 14, having further instructions stored therein, which when executed, cause a machine to perform a set of operations comprising:
resetting a grant count for a first stream of the first request; and
assigning the first stream to a lower priority arbitration pool.

16. The machine-readable storage medium of claim 14, wherein a grant count for a first stream of the first request is exhausted and a grant count for a second stream of the second request has not been exhausted.

17. The machine-readable storage medium of claim 14, having further instructions stored therein, which when executed, cause a machine to perform a set of operations comprising:
designating pending requests for forwarding from a lower priority arbitration pool over pending requests of a higher priority arbitration pool until required resources for the higher priority arbitration pool are available.

18. The machine-readable storage medium of claim 14, having further instructions stored therein, which when executed, cause a machine to perform a set of operations comprising:
receiving resource availability information from the first destination and the second destination.

19. The machine-readable storage medium of claim 14, having further instructions stored therein, which when executed, cause a machine to perform a set of operations comprising:
designating pending request for forwarding from a stream with a lower priority prior to pending requests from a stream with a higher priority based on the stream with the higher priority being assigned to a lower priority arbitration pool and the stream with a lower priority being assigned to a higher priority arbitration pool.

20. The machine-readable storage medium of claim 14, wherein the arbiter device is a component of a PCI express root complex and the first destination and second destination are PCI express devices.

* * * * *